United States Patent [19]
Adams, Jr.

[11] 3,979,639
[45] Sept. 7, 1976

[54] CORRECT EXPOSURE ANNUNCIATOR CIRCUIT

[75] Inventor: James R. Adams, Jr., Littleton, Colo.

[73] Assignee: Honeywell Inc., Minneapolis, Minn.

[22] Filed: Aug. 11, 1975

[21] Appl. No.: 603,564

[52] U.S. Cl. .......................... 315/241 P; 315/134; 315/135; 315/151; 315/159

[51] Int. Cl.[2] ..................... H05B 41/32; G01J 1/16

[58] Field of Search ............... 315/241 P, 151, 156, 315/158, 159, 129, 134, 135, 136; 354/145

[56] References Cited

UNITED STATES PATENTS 3,814,985 6/1974 Pecher et al. ................ 315/241 P

*Primary Examiner*—Eugene La Roche
*Attorney, Agent, or Firm*—David R. Fairbairn

[57] ABSTRACT

An electronic flash apparatus terminates the light flash when light received from the subject has reached a predetermined level. The light terminating means includes a terminating capacitor which is discharged during the termination of the flash. Annunciator control signal generating means senses when the terminating capacitor is being recharged, and produces an annunciator control signal. An annunciator receives the annunciator control signal and provides an indication that the light terminating means has terminated the flash.

14 Claims, 2 Drawing Figures

CORRECT EXPOSURE ANNUNCIATOR CIRCUIT

REFERENCE TO CO-PENDING APPLICATION

Subject matter disclosed but not claimed in this application is disclosed and claimed in a co-pending application Ser. No. 603,565 entitled "Correct Exposure Annunciator" by James R. Adams, Jr. and Dennis J. Wilwerding which was filed on even date herewith and assigned to the same assignee.

BACKGROUND OF THE INVENTION

The present invention relates to automatic electronic or "computer" flash systems. In particular, the present invention relates to a correct exposure annunciator for use with automatic electronic flash systems.

Automatic electronic flash systems include a light producing means, generally a flash tube, which is actuated to illuminate a scene which is being photographed. A light sensing or exposure control circuit detects the scene illumination and actuates a light teminating or light quenching means when sufficient light has been produced to properly expose a light sensitive film of an associated camera.

There is a need for an annunciator which will indicate to the photographer whether sufficient light has been produced to properly expose the film. When an automatic electronic flash system is used, the exposure control circuit will terminate the light flash prior to its normal conclusion if sufficient light has been received. In U.S. Pat. No. 3,706,911 by Dennis J. Wilwerding, a correct exposure annunciator circuit is provided. In this circuit, a switch is responsive to the operation of the light quenching means. The closure of this switch energizes the annunciator.

Although the correct exposure annunciator circuit of the Wilwerding patent is generally satisfactory, it does have some shortcomings. In particular, it typically requires a relatively large number of additional components (12 to 15 components in many cases). This increases cost and affects reliability of the flash system.

SUMMARY OF THE INVENTION

In the present invention, electronic flash apparatus includes light terminating means for terminating the light in response to a terminating signal. The terminating means includes terminating capacitor means which is discharged during the termination of the light. Annunciator control signal generating means senses when the terminating capacitor means is being charged and produces an annunciator control signal. Annunciator means receives the annunciator control signal and provides an indication that the terminating means has terminated the light.

DETAILED DESCRIPTION OF THE PREFERRED EMBODIMENTS

Figure 1:
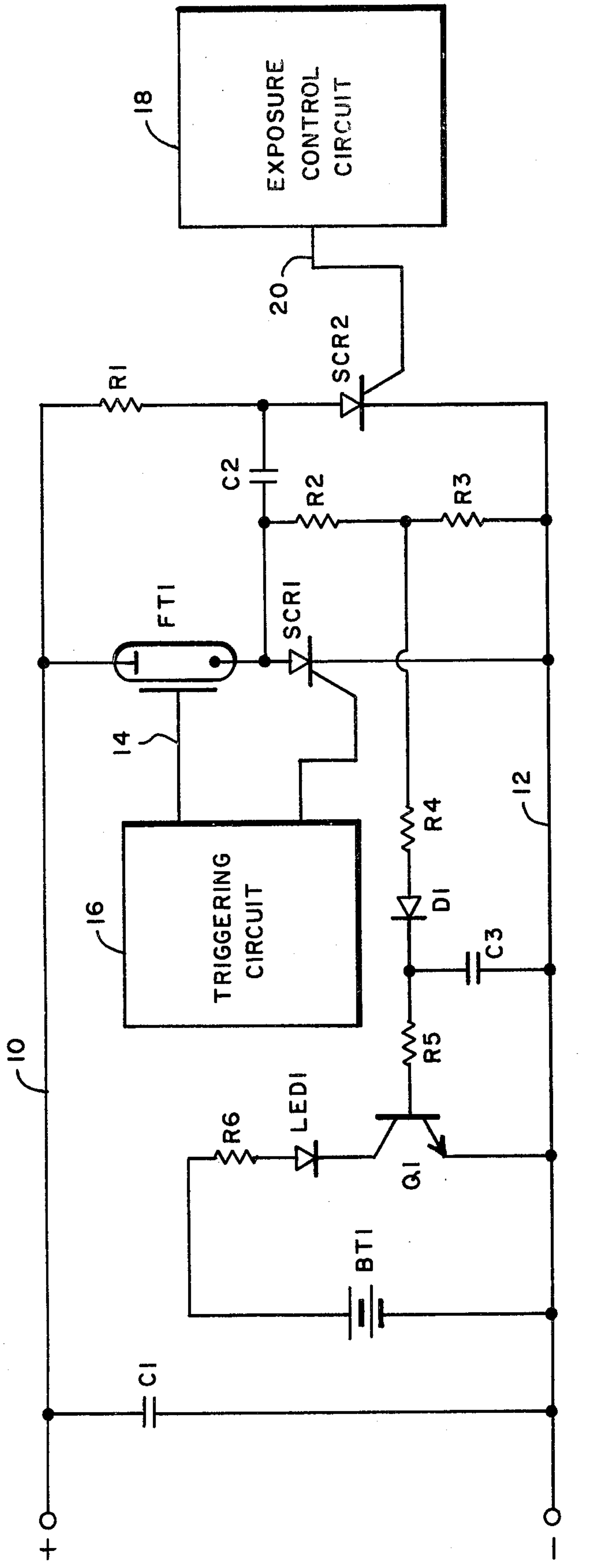
FIG. 1 schematically shows electronic flash apparatus including the correct exposure annunciator circuit of the present invention.

FIG. 1 shows one preferred embodiment of the present invention. The electronic flash apparatus of FIG. 1 includes conductor 10, which is connected to a positive terminal, and conductor 12, which is connected to a negative terminal. The positive and negative terminals are adapted to be connected to the usual capacitor charging means (not shown) which are used in conjunction with electronic flash apparatus.

Flash storage capacitor C1 is connected between conductors 10 and 12. Also connected between conductors 10 and 12 is the series connection of flash tube FT1 and flash termination switch SCR1. As shown in FIG. 1, flash termination switch SCR1 may be a semiconductor switching device such as a silicon controlled rectifier. SCR1 has two main current carrying electrodes (anode and cathode) and a control electrode (gate) which controls the conductivity between the anode and cathode. In FIG. 1, the anode of flash tube FT1 is connected to conductor 10. The cathode of flash tube FT1 is connected to the anode of SCR1, and the cathode of SCR1 is connected to conductor 12.

In order to initiate a light flash, a first control or triggering signal must be applied to the triggering terminal 14 of flash tube FT1 and to the gate of SCR1. This first control signal is produced by triggering circuit 16, which may take one of many well known forms. Examples of triggering circuits which may be used are shown in U.S. Pat. No. Re 28,025 by Murata et al and 3,809,954 by Engelstatter.

An exposure control circuit 18, receives light reflected from the scene which is illuminated by the flash. When the total light received by exposure control circuit 18 exceeds a predetermined desired value, exposure control circuit 18 produces a second control or terminating signal at terminal 20. Exposure control circuit 18 may take one of many well known forms and is preferably of the general type described in U.S. Pat. No. Re. 26,999 by F. P. Elliott and No. 3,519,879 by F. T. Ogawa.

FIG. 1 includes a terminating circuit for turning off SCR1 and thus terminating the light flash in response to the terminating signal at terminal 20. The terminating circuit, which includes resistors R1, R2, and R3, commutation or terminating capacitor C2, and commutation switch SCR2, turns off SCR1 by the well known commutation technique. A light flash which is terminated by commutation will be hereafter referred to as a "commutated flash".

Commutation switch SCR2 is, like SCR1, preferably a semiconductor switching device. SCR2 has two main current carrying electrodes (anode and cathode) and a control electrode (gate). The gate of SCR2 is connected to terminal 20 to receive the terminating signal. The cathode of SCR2 is connected to conductor 12, and the anode of SCR2 is connected to one terminal of commutation capacitor C2. The other terminal of commutation capacitor C2 is connected to the anode of SCR1.

Commutation capacitor C2 is charged through a charging circuit which includes resistor R1, commutation capacitor C2, and resistors R2 and R3. One terminal of resistor R1 is connected to conductor 10. The other terminal of resistor R1 is connected to the junction of the anode of SCR2 and one terminal of C2. Resistors R2 and R3 are connected in series between the other terminal C2 and conductor 12, with R2 connected to C2 and R3 connected to conductor 12.

An annunciator control signal generating circuit is connected to the junction of resistors R2 and R3. This circuit includes resistors R4 and R5, diode D1, and capacitor C3. This circuit receives a charging signal (in this case the voltage across resistor R3) which is indicative of the charging current to commutation capacitor C2, and produces a third or annunciator control signal which has a different duration than the charging signal.

One terminal of resistor R4 is connected to the junction of resistors R2 and R3. The other terminal of resistor R4 is connected to the anode of diode D1. The cathode of D1 is connected to one terminal of resistor R5. Capacitor C3 is connected between the cathode of D1 and conductor 12.

Correct exposure annunciator LED1, which is preferably a light emitting diode, is serially connected in an energization circuit which includes battery BT1, resistor R6, and the collector — emitter current path of transistor Q1. The base of transistor Q1 is connected to resistor R5 to receive the annunciator control signal, and the emitter of Q1 is connected to conductor 12.

The operation of the apparatus shown in FIG. 1 is generally as follows. Capacitor C1 is charged to a relatively high voltage by the usual capacitor charging means which are now shown in FIG. 1, but which are well known in the art. Capacitor C1 is a source of energy to the electronic flash apparatus during the production of the light flash.

To initiate a flash, the user closes contacts (not shown) which form a part of triggering circuit 16. Triggering circuit 16 produces the first control signal at triggering terminal 14 of flash tube FT1 and at the gate of SCR1. This first control signal causes FT1 and SCR1 to turn on, and FT1 begins to produce the light flash.

Once FT1 and SCR1 have been triggered on and light is being produced by FT1, exposure control circuit 18 begins to sense the light reflected from the object being illuminated. When the total light received by exposure control 18 reaches a predetermined desired value, a terminating signal is produced at terminal 20. This terminating signal is applied to the gate of SCR2, thereby turning SCR2 on.

When commutation switch SCR2 is turned on, the voltage across commutation capacitor C2 is applied to anode — cathode of SCR1, thereby reducing the voltage at the anode of SCR1. This reduction in voltage at the anode of SCR1 turns off SCR1, thereby terminating the light flash.

When a light flash is terminated by commutation, commutation capacitor C2 has been discharged and must be recharged from capacitor C1 through the current path including R1, C2, R2, and R3. The voltage across resistor R3 (i.e. the charging signal) as a result of the charging current is coupled via resistor R4 and diode D1 to capacitor C3. Diode D1 prevents a discharge of C3 through resistor R4 and R3. With capacitor C3 charged to the peak voltage across resistor R3, C3 discharges through resistor R5 and the base-emitter junction of Q1. This discharge current turns on Q1, thereby closing the energization circuit and allowing annunciator indicator LED1 to turn on.

The values of capacitor C3 and resistor R5 are chosen such that the discharge of capacitor C3 through R5 and base— emitter of Q1 is relatively long. The discharge time is typically two to five seconds, but may be longer if desired. LED1 remains on, (indicating proper exposure) until the discharge current from C3 can no longer keep Q1 saturated. At that time, the current through LED1 decreases and LED1 turns off. The circuit shown in FIG. 1, therefore, allows LED1 to be held on for a period which is longer than the period during which a charging current is being supplied to capacitor C2.

Figure 2:
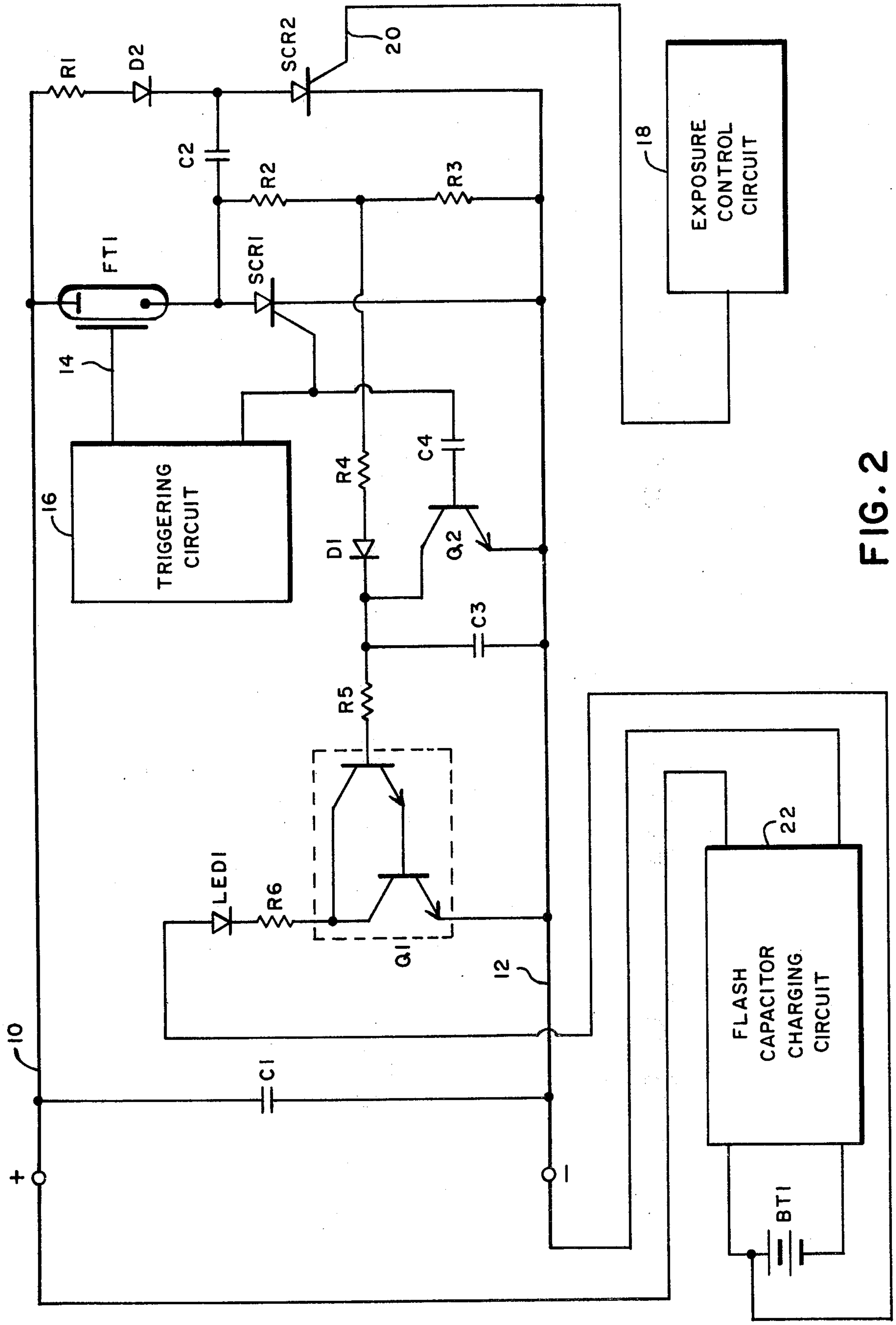
FIG. 2 schematically shows another embodiment of the present invention.

FIG. 2 shows another embodiment of the present invention. This embodiment is generally similar to that shown in FIG. 1, and similar numbers and numerals are used to designate similar elements.

Transistor Q1 is a Darlington transistor in FIG. 2. This differs from FIG. 1, in which Q1 is a single transistor.

In FIG. 2, a flash capacitor charging circuit 22 is connected to terminals 10 and 12. Flash capacitor charging circuit 22, for example, may be of the type described in U.S. Pat. No. 3,863,128 by Dennis J. Wilwerding. Battery BT1, which provides current to annunciator indicator LED1, is preferably the battery which powers flash capacitor charging circuit 22.

The charging circuit for commutation capacitor C2 includes optional diode D2, which is connected between resistor R1 and capacitor C2. Diode D2 prevents capacitor C2 from discharging through resistor R1 by allowing current flow only from conductor 10 through resistor R1 and diode D2 and into capacitor C2.

In some applications, it is desirable to ensure that the annunciator is turned off before each flash. FIG. 2 also includes an optional dumping circuit which provides this feature by removing the charge from capacitor C3 before each flash. This circuit includes transistor Q2, which has its collector — emitter current path connected in parallel with capacitor C3, and coupling capacitor C4. The base of transistor Q2 is connected through coupling capacitor C4 to a point in triggering circuit 16 which shows a charge in voltage as a result of triggering. In other words, Q2 is controlled by a fourth control signal which is associated with the production of the first control signal. In the particular embodiment shown in FIG. 2, the base of Q2 is connected through capacitor C4 to the gate of SCR1, but it may be connected to any other point which shows a change in voltage as a result of triggering. When a positive rise in voltage at the gate of SCR1 occurs as a result of triggering, this positive rise in coupled through C4 to the base of Q2, thereby turning Q2 on. The charge remaining on C3 is then dumped through the collector — emitter current path of Q2.

In conclusion, the annunciator circuit of the present invention utilizes the fact that one indication of proper exposure in electronic flash apparatus of the type shown in FIGS. 1 and 2 is that the commutation capacitor C2 has been discharged and must be recharged. The annunciator control signal generating circuit senses when capacitor C2 is being recharged and provides an annunciator control signal.

An annunciator control signal will not be produced, and annunciator LED1 will not emit light, if the light flash is terminated because the voltage on C1 eventually drops to a level which will no longer support conduction through flash tube FT1. This situation, which is termed a "full light flash", occurs when sufficient light has not been received by exposure control circuit 18 before substantially all of the energy has been dissipated from flash capacitor C1. In this case, the annunciator for the present invention does not indicate correct exposure because SCR2 has never been turned on and capacitor C2 has never been discharged.

The present invention is a highly advantageous correct exposure annunciator for automatic electronic flash systems. First, the present invention provides a reliable indication that termination of the flash has occurred as a result of the exposure control circuit receiving the required amount of light. Second, the present invention has a very low cost, since the additional components required to provide the correct exposure indication are few and low in cost. Third, the annunciator signal is automatically terminated after a predetermined period of time, thus eliminating the need for any mechanical or manual reset switch.

Although the present invention has been described with reference to preferred embodiments, workers skilled in the art will recognize that changes in form and details may be made without departing from the spirit and scope of the present invention. For example, although the commutation capacitor in a series termination type flash unit has been described as the terminating capacitor, the annunciator of the present invention may sense the charging current to any other capacitor (other than C1) which is discharged during the termination of the light flash by the terminating means and which is recharged after termination.

The embodiments of the invention in which an exclusive property or privilege is claimed are defined as follows:

1. Electronic flash apparatus comprising:

first control signal generating means for generating a first control signal;

second control signal generating means for generating a second control signal;

light producing means for producing light in response to the first control signal;

terminating means for terminating the light in response to the second control signal, the terminating means including terminating capacitor means which is discharged during the termination of the light;

terminating capacitor charging means for charging the terminating capacitor means;

third control signal generating means for receiving a charging signal indicative of the charging of the terminating capacitor means and producing a third control signal; and annunciator means for providing, in response to the third control signal, an indication that the terminating means has terminated the light.

2. The electronic flash apparatus of claim 1 wherein the annunciator means comprises:

annunciator indicator means selectively operable to a condition indicative of the occurrence of a termination of the light by the terminating means; and control means connected in an energization circuit with the annunciator indicator means, the control means being responsive to the third control signal to effect a closure of the energization circuit thereby activating the annunciator means to the condition.

3. The electronic flash apparatus of claim 2 wherein the annunciator indicator means comprises a light emitting diode.

4. The electronic flash apparatus of claim 2 wherein the control means comprises a semiconductor switching means.

5. The electronic flash apparatus of claim 4 wherein the semiconductor switching means comprises transistor means.

6. The electronic flash apparatus of claim 1 wherein the third control signal generating means comprises:

third capacitor means for supplying the third control signal to the control means; and charging circuit means for charging the third capacitor means in response to the charging signal.

7. The electronic flash apparatus of claim 6 wherein the charging circuit means comprises unidirectional current control means connected between the terminating capacitor charging means and the third capacitor means for allowing the third capacitor means to charge when the terminating capacitor is being charged and preventing the third capacitor means from discharging through the terminating capacitor charging means.

8. The electronic flash apparatus of claim 7 and further comprising resistor means connected between the third capacitor means and the control means.

9. The electronic flash apparatus of claim 7 and further comprising dumping circuit means for removing charging from the third capacitor means in response to a fourth control signal.

10. The electronic flash apparatus of claim 9 wherein the fourth control signal is associated with the production of the first control signal.

11. The electronic flash apparatus of claim 1 wherein the third control signal generating means produces a third control signal which has a greater duration than the charging signal.

12. In electronic flash apparatus including first capacitor means, flash tube means for selectively discharging the first capacitor means to produce a light flash, terminating signal means for producing a terminating signal, terminating means for terminating the light flash in response to the terminating signal, the terminating means including second capacitor means which is discharged during termination of the light flash, and second capacitor charging means for supplying charging current to the second capacitor means subsequent to termination of the light flash, the improvement comprising:

annunciator control signal generating means for receiving a charging signal indicative of the charging current and producing an annunciator control signal of different duration than the charging signal; and annunciator means for providing, in response to the annunciator control signal, an indication that the terminating means has terminated the light flash.

13. The invention of claim 12 wherein annunciator means comprises:

annunciator indicator means; and control means connected in an energization circuit with the annunciator indicator means, the control means being responsive to the annunciator control signal.

14. The invention of claim 13 wherein the annunciator control signal generating means comprises an RC network connected between the second capacitor charging means and the control means for providing an annunciator control signal of greater duration than the charging signal.

* * * * *